April 30, 1940.  C. MEYER  2,198,880
CAKE OF SOAP OR OTHER TABLET OR BLOCK COVERED WITH A SOFT SHEATH
Filed May 1, 1937  4 Sheets-Sheet 1
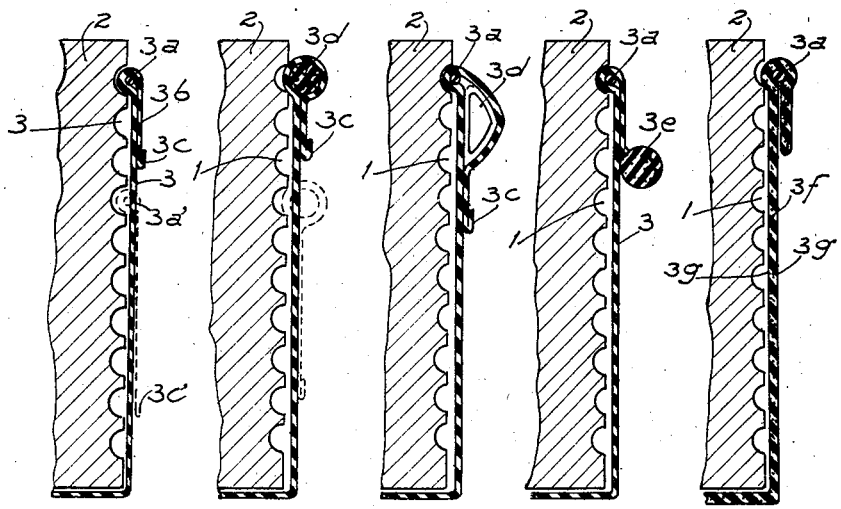
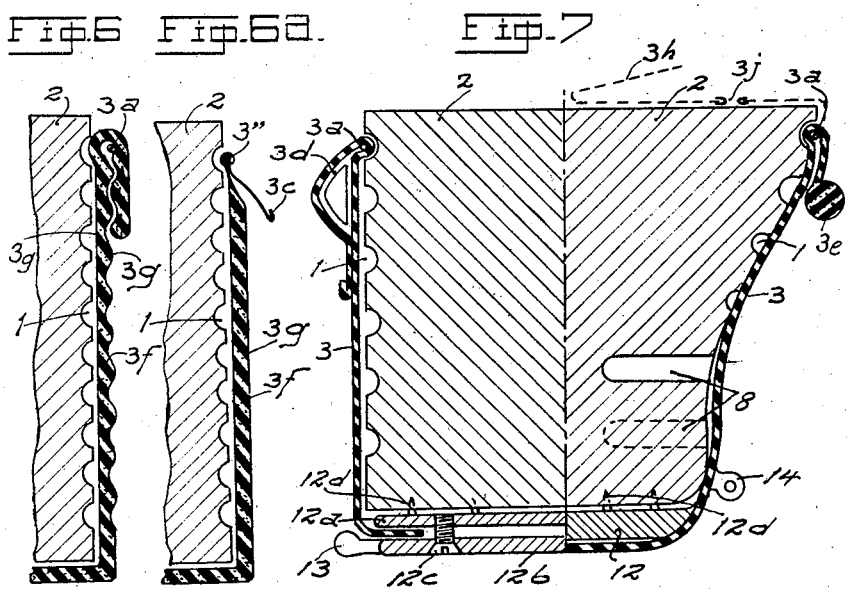
Inventor
Claude Meyer
by Guido M Sacerdote
Attorney Inventor
Claude Meyer
by Guido M. Sacerdote
Attorney April 30, 1940.  C. MEYER  2,198,880
CAKE OF SOAP OR OTHER TABLET OR BLOCK COVERED WITH A SOFT SHEATH
Filed May 1, 1937  4 Sheets-Sheet 3
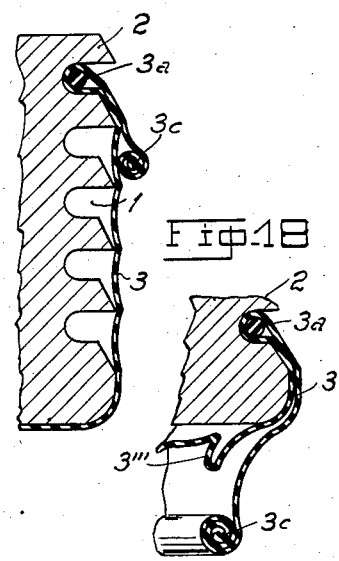
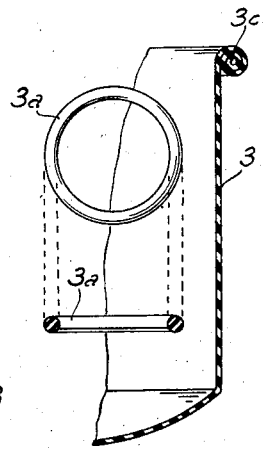
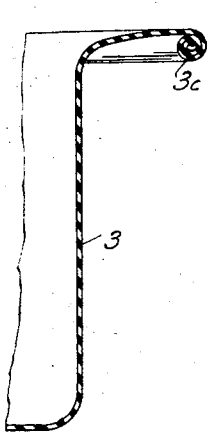
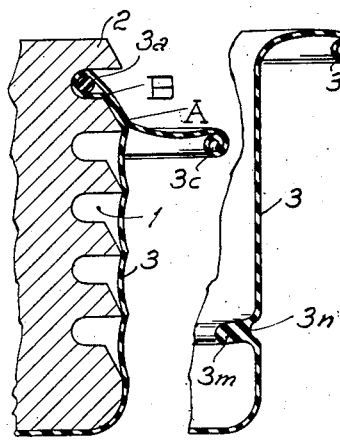
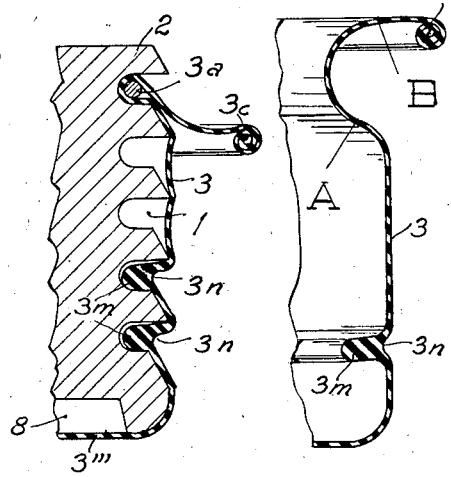
Inventor
Claude Meyer
by Guido M. Friedrich
Attorney

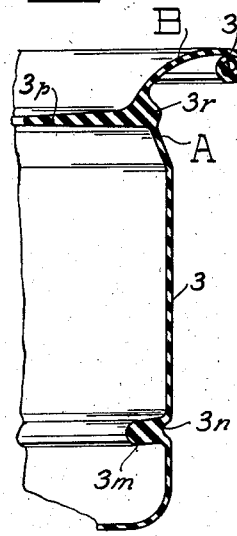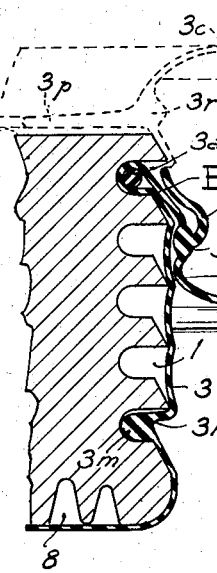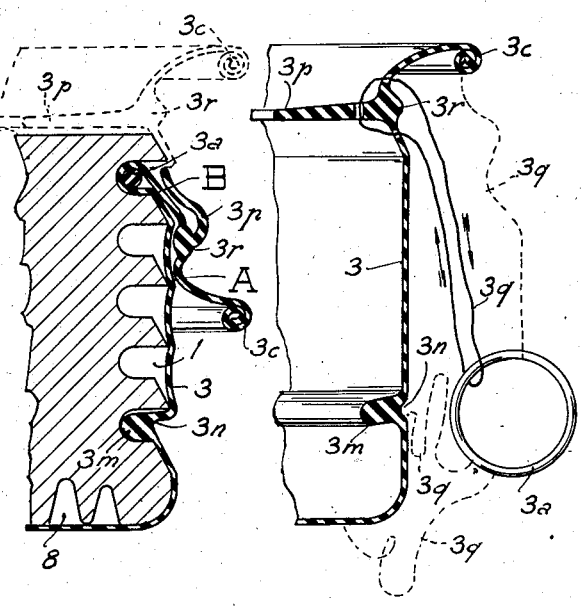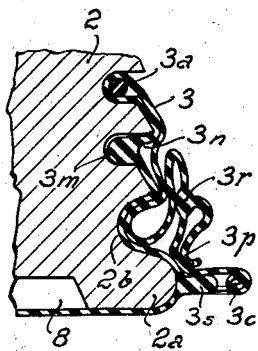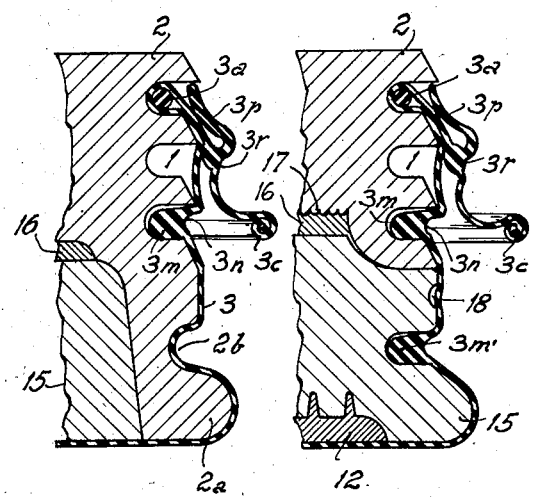

Patented Apr. 30, 1940

2,198,880

UNITED STATES PATENT OFFICE 2,198,880

CAKE OF SOAP OR OTHER TABLET OR BLOCK COVERED WITH A SOFT SHEATH

Claude Meyer, Paris, France

Application May 1, 1937, Serial No. 140,109
In France May 9, 1936

9 Claims. (Cl. 87—23)

This invention relates to a grooved cake of soap or other tablet or block called "soap" afterwards covered with a soft sheath which can be drawn down on the sides of the block as and when the soap is consumed, and fixed at the desired height.

The presence of the sheath on the sides other than that being consumed procures for the soap-sheath unit, to be kept lying preferably on one of the covered sides, the following advantages, viz:

Only the rubbing surface is exposed to contact with water, thus avoiding pure loss on the other surfaces by the running water and by the soap sticking to the soap-holder when not in use.

The soap does not slip on the wash-board or in the hand, thus affording a better grip and diminished fatigue.

The skin troubles due to continued direct contact with soap are avoided.

It provides a clean soap-holder.

It permits the user leaving the soap in water without causing too much loss by dilution.

In view of the air imprisoned between the sheath and the soap, or in the sheath itself, the unit is made floatable, limiting dilution to one side only if same is totally or partially submerged; this dilution is entirely avoided if the rubbing surface is kept out of the water.

The soap and sheath may be made in various ways in order to conveniently realize the above indicated advantages, and in each case the invention is characterized by the fact that the sheath descends as and when the soap is consumed. Various forms of both soap and sheath are hereinafter described and represented in the annexed figures, but these are only by way of example to illustrate the inventive idea.

It should be noted that certain figures taken from my applications for Manufacture of soap in tablets, or the like, filed June 7, 1935, Serial No. 25,488, now issued as Patent No. 2,132,746 of October 10, 1938, and for Tablet of soap, filed August 11, 1936, Serial No. 95,392 now issued as Patent No. 2,138,873 of December 6, 1938, copending herewith, have only been included in order to complete the description or to serve as a basis for setting in evidence certain improvements of details.

Figures 1 to 6a show sections of various types of sheaths mounted on the side of a block of soap having flutings or grooves.

Figure 7 is a cross section of a floating unit provided with a ballast insuring the soap turning in the water with the rubbing surface upwards.

Figure 11:
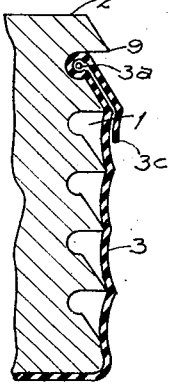
Figure 12:
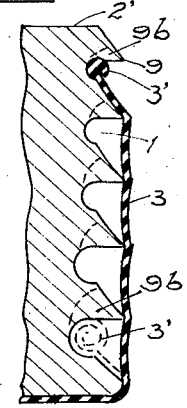
Figure 13:
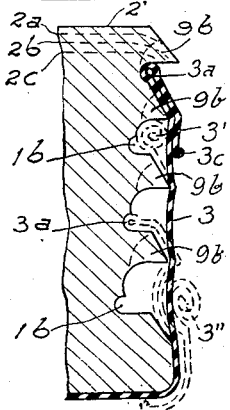

Figure 11 shows a water-jet grooved soap, to be used in connection with a sheath drawn back; Figure 12 shows a similar form for a rolled up sheath; Figure 13 shows a combined form of the two preceding ones.

Figure 14:
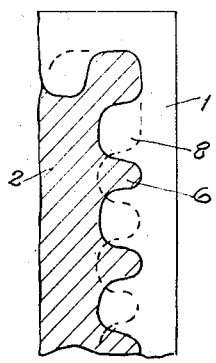

Figure 14 shows a plane section of grooves with cells.

Figure 15:
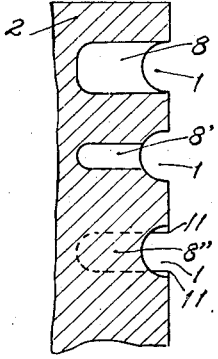

Figure 15 shows a cross section of variations of this kind of groove.

Figure 16:
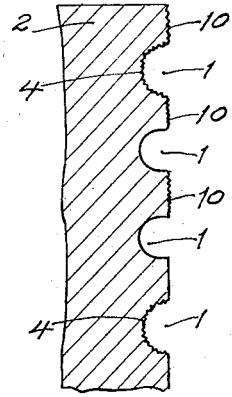

Figure 16 shows a cross section of block sides, the surfaces or grooves of which are provided with flutings or corrugations.

Figure 17 is merely a reproduction of the above Figure 11 and is only given to facilitate the understanding of the description; Figure 18 shows the covered soap of Figure 17 in its last stage of use; Figure 19 shows the sheath alone and the ring for fixing the sheath over the soap as on Figure 17.

Figures 20 to 26 show modifications of the sheath 3 mounted on the soap shown in Figure 17.

Figure 27 shows means for attaching the fixing ring.

Figure 28 also shows an improvement in the soap itself.

Figures 29 and 30 show the possible insertion between the sheath and the soap of a block preferably of substance other than soap.

In these figures the same numbers designate the same parts; 1 designates the flutings or grooves in soap 2; 3 is the soft sheath; 3a is the fixing ring; 3c is the edge of the sheath, generally a bead.

In Figure 1 the sheath is made of a sheet of soft substance of which the border is reversed over a fixing ring 3a which retains the sheet 3 in one of the flutings or grooves 1. Consequently, it is easy to mount sheath 3 in position and its wear is diminished since its fit on the block does not have to be too close. It is obvious that grooves, if they are peripheric, are more readily made watertight than a plane surface or a surface having flutings or grooves at an angle to the active surface of the soap. It is to be noted that the part 3b of the sheath reversed over and covering the sheath in advance of the ring 3a, as well as the edge bead 3c if such exists, all additionally contribute to the holding power and, by holding back the ring 3a, prevent the latter from bringing sheath 3 to the rubbing surface in case the ring is not sufficiently held by the up end groove. The fixing ring thus insures a watertight sheath on the soap, irrespective of its profile, and replaces with advantage rolled bead 3' (see Figs. 10, 12) which would not close over slightly convex contours.

If the surface wear of block 2 renders it necessary to draw the sheath back, its edge or bead 3c should be drawn downwardly, thus causing fixing ring 3a to roll, or slip within the fold and to fall into one of the following grooves or flutings (position 3a'—3c'). This arrangement saves the operator the necessity of gripping the sheath at a point close to the soap on which the fingers would easily slip, since in this case the sheath is manipulated on both sides (the right side and the wrong side). Finally, the fact that the sheath is simply drawn back on itself and slides over the ring, frequently prevents the sides from sticking, an occurrence which may take place with a rolled bead and more particularly at the centre of a bead left too long in the same position.

The arrangement further eliminates a cause of deterioration and contributes to prolonging the life of the sheath which can be used again on many cakes of soap.

Figure 2 shows a sheath 3 of the same kind, in the field of which is imprisoned a ring or belt 3d of a hollow or cellular substance, or in skeleton form (for example a coil), which serves to imprison a supplement of air and thus assure increased floatability of the unit. In view of its elasticity, this belt can also insure or improve the adherence of sheath 3 on block 2.

Figure 3 shows a combined arrangement of the means presented in Figures 1 and 2, comprising in the fold of the sheath a fixing ring 3a and a skeleton belt 3d of triangular shape advancing by sliding on the side of the soap whilst the ring rolls from one row to the next.

Figure 4 shows a sheath 3, whose edge forms a hollow bead 3e, enclosing a soft cellular substance like soft rubber which imprisons a large proportion of air, or any other material of low specific weight to contribute to the floatability.

In Figure 5 the sheath 3 is comprised of a sheet of soft rubber 3f covered with a sheet of soft water-tight material 3g like that obtained by dipping in latex and turned back on a fixing ring 3a in the manner explained in this respect under Figure 1. This arrangement which assures floatability in another fashion, has the further advantage of rendering the gripping action on the soap more supple.

In Figure 6 the sheath is made similar to that shown in Figure 5, but it is of varying thickness the thinner parts corresponding to the grooves of the soap, in order to render the pressure of the ring 3a more efficient.

In Figure 6a the fixing ring, instead of being separate is fixed to the sheath 3 in 3'' so that the size of the portion of the sheath beyond the fixing ring between 3'' and 3 remains the same all the time of the use of the soap. This allows the user to grip quicker and easier the sheath near the fixing ring, in order to pull it down so as to have the fixed fixing ring 3'' advance from one fluting to the next. In this particular case and in order to avoid the inconveniences shown in Figure 6 showing the whole sheath forming an accumulation of soft webbing 3''', it will be advisable to have a short sheath in order that it is so stretched on the soap that as the fixing ring 3'' advances the sheath contracts staying tight instead of becoming gradually too much loosened.

In Figure 7 there is shown at the left a block 2 on which is placed sheath 3 fitted with a ballast comprised of two parts 12a and 12b, which latter by the action of screws 12c clamp the edges of sheath 3. A unit is thus formed which stabilizes block 2 by letting the non-protected part emerge from the water entirely or partially.

On the right of Figure 7 there is a hull-shaped block which facilitates the turning of the unit left in the liquid in any position; in this example ballast 12 is interposed between sheath 3 and block 2.

In the example of Figure 7, ballast 12 may be advantageously fitted in a manner known with prongs 12d penetrating in block 2 to avoid slipping between these two elements. The soap may further be provided at the base with cavities 8 inwardly extending from its outer surface in a manner known, in order to insure sufficient floatability, its own density and that of the ballast notwithstanding when the sheath has had to be brought to the last layer. Consequently the rest of the soap which projects from the sheath may still be floatable during the last part of its use, as the water does not enter the cavities.

On the other hand, and in order to protect the damp part of the soap and do away with the soap box used when traveling, sheath 3 may be provided with an additional piece 3h sufficiently long to permit it of being closed like a tobacco pouch. However, in the present case an opening 3j is made to permit the air to escape when the sheath is made to cover the rubbing surface.

Finally, sheath 3 or ballast 12 may be fitted with an attaching device like a button 13 or a lug 14, to allow a knot to be made to secure the soap to some point of attachment; thus when applying a sheath to soap destined for washing by the water side, this device will be very practical for making a knot to keep the soap at hand.

Figure 8:
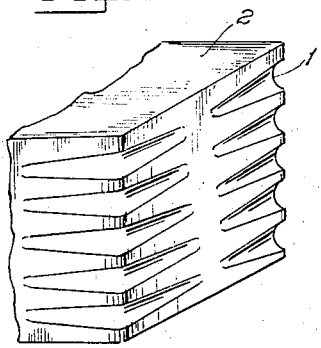
Figures 8 and 9 show soaps with flutings or grooves separated by light, fragile partitions.

Figure 8 shows in perspective a block 2 in which flutings 1 reach only about its corners, these flutings being sufficient to hold ring 3a or 4d retaining sheath 3 in position.

Figure 9:
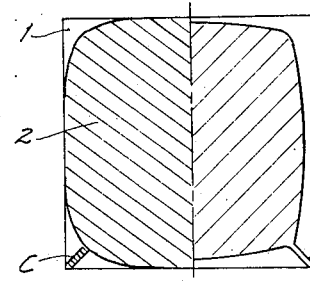

Figure 9 shows a plane section; on the left there is the same form of embodiment as in Fig. 8, as well as a variation in which a light partition c extends in fluting 1 at each corner of the block, said partition being sufficiently fragile to be broken or bent by the bead or fold of the sheath; this does not mar the result but offers the advantage of presenting a block which is more similar to that which users are accustomed to seeing. On the right of this figure there is a peripheral groove interrupted by light partitions c as explained above.

Figure 10:
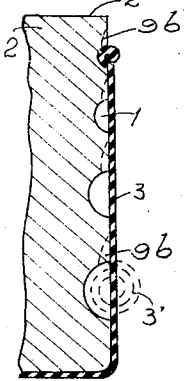
Figure 10 shows a soap with grooves having progressively larger sections for rolled-up sheaths.

Figure 10 shows a block with grooves or flutings 1, adapted to receive a sheath 3 the border of which is rolled on itself as and when the rubbing surface 2' wears off. For this purpose the section of the grooves or flutings increases until it corresponds approximately to the diameter of bead 3' formed by the sheath rolled on itself. This form of embodiment offers the further advantage of having wider layers towards the bottom of the soap, so that the pressure of the hand and shocks to which the side of the soap most used may be frequently exposed, will be less likely to damage the same.

In cases when, as described below, a simple rolled sheath is used, this may be made narrow towards the opening with a view to improving the hold of the bead formed by the rolled edge.

Figure 11 shows a variation of the section of grooves in which the external surface of the ridges between the grooves is at a slant in relation to the sides of the block which sides may be straight or curved, so that the upper surface 9 of the grooves materially overlap the fold of the sheath and thus causes the dripping water to form a curtain without seeping through. The inclined surfaces further facilitate the passage of the sheath from one fluting to the next. Finally the edges 9 improve the frictional hold of sheath 3 owing to the fact that their contact surface with the same is theoretically nil.

Figure 12 shows a variation of the same type of groove, made to receive a rolled-edge sheath; to this end the grooves are of progressively increasing section as shown in the example in Figure 10.

Figure 13 shows a combined form of groove adapted to receive the sheath either of the folding type (with fixing ring 3a) or with a bead rolled on itself (3') and to this end the grooves are of progressively increasing section towards the base as per example in Figure 12, but are formed of a uniform section 1b with secondary grooves which may be that of the groove nearest the rubbing surface, said secondary grooves serving in case the sheath is folded over the fixing ring 3a; these secondary grooves are arranged preferably in the part of the main groove furthest from the rubbing surface, so that wear will reach it as late as possible.

This form of embodiment makes it possible to use the sheath with fold and fixing ring, but if the latter is lost the sheath may be rolled into a bead with the same advantages as those mentioned in connection with Figure 12.

If the sheath is used with fold and fixing ring, the moment arrives when the part of the sheath not resting on the soap becomes longer than the height of the remaining soap. This excess furnishes a better grip of the soap, the height of which diminishes by usage. However, when this part of the sheath becomes too cumbersome due to its volume and thus interferes with the grip upon the soap, bead 3c may be advantageously rolled on itself and reversed against the soap as shown in 3".

It is to be noted that the forms shown in Figures 11 to 13 have the effect of embedding the fold or bead of the sheath deeper; consequently the use of the soap surface which will always become a little rounded on the borders, may continue further before necessitating turning back the sheath; the dotted lines 2a, 2b and 2c shown on Figure 13 represent this progressive wear and show how this advantage may be realized at each step.

It will be further noted that in these figures the inclined surfaces in question cause the ridges to have the shape of a swallow's tail in relation to the operator's hand, i. e. they are in the most favorable condition for exerting a good grip with a minimum of yielding.

In Figures 10, 1 and 13 in which the grooves are adapted to receive the edge of the sheath rolled in a bead, cut grooves or mitres 9b may also be provided in the upper edges of the grooves to permit easier access with the finger to the bead 3' resting against the bottom of the groove; these mitres in adjoining grooves are preferably in staggered relation to one another.

Figure 14 shows in section through a groove a block in which recesses 8 are provided on the bottom of each groove 1, separated by ribs 6. The latter reinforce the inter-grooves which may thus be deeper, the cells 8 imprisoning more air under the sheath.

Figure 15 shows a vertical cross section of a grooved block of this nature in which some various types of recesses appear; in fact cells 8 may have the same height as groove 1, or the height may be less as in 8', or the groove itself may be narrower where it meets the recess as in 8", to assure better contact of the unsupported fold or bead against edges; this arrangement also reinforces the inter-grooves at this point. The ribs should be arch shaped in order to better support the fold or bead of sheath 3 and it is preferable to place them in staggered arrangement as shown in dotted lines on Figure 15.

It will be an advantage to have the recesses progressively increasing in size towards the rubbing surface in order to lower the centre of gravity of the unit and increase its tendency to turn with the rubbing surface upwards in a liquid.

Finally, Figure 16 shows a form of embodiment in which the sides of the block or the surfaces of the grooves or both are provided with indentations 4 or 10 the general direction of which is almost parallel to the rubbing surface, these indentations forming ridges the effect of which is to diminish the surface of contact, thus increasing the pressure of the sheath on the sides.

Figures 17, 18 and 19 illustrate how the embodiment just described might give rise to three objectionable conditions:

1. The difficulty for the user to grip sheath 3 in proximity of bead 3c in order to roll fixing ring 3a from the groove reached by the wear of the soap to the next groove; in fact, in order to grip the sheath it is necessary to insert a finger between bead 3c and the part of the sheath 3 in contact with the soap, and this requires an effort that increases as bead 3c becomes thicker and tighter;

2. The difficulty of placing the sheath on a new piece of soap, as it has to be stretched for insertion, this being more difficult when bead 3c is thick.

3. Upon reaching close to the end of the soap, it will be observed that, as shown on Figure 18, by pulling on bead 3c the whole sheath will also be gradually loosened, and an accumulation of soft webbing 3''' will be formed which looks untidy and causes a bad grip of the hand as the palm is in contact with a part of the sheath which is loose.

Figures 20 and 21 show how to overcome the first and second of the above objectionable conditions.

Figure 20 shows a sheath 3 which, when not holding any soap has its mouth widened in such a manner that the edge or bead 3c (as shown in Figure 21) does not bind and overhangs, thus permitting an easy grip; thus the first condition described above is overcome. The second condition making the sheath hard to mount on the soap is also overcome in view of the fact that, in order to set sheath 3 in position, it is sufficient to draw bead 3c without having to stretch it.

Regarding the third condition shown in Figure 18, this is avoided as shown in Figures 22 and 23 by the addition to sheath 3 of one or more ribs 3m acting as more fillings for one or more grooves towards the bottom of the soap; the hold caused on the soap by these fillings 3m may further be increased by diminishing their circumference, or by making that part tighter than the rest of sheath 3. Thanks to these fillings, part 3'''' of sheath 3 has no tendency to slipping and therefore cannot produce the accumulation of soft webbing shown in 3''' on Figure 18, the objections to which have already been indicated.

It will be of advantage to produce in correspondence of reinforcements 3m, grooves 3n in which the fixing ring 3a may lodge when wear reaches to the point of such fillings 3m.

It will be readily understood that besides serving the purpose just explained, the fillings 3m contribute also to improve the tightness of the sheath.

However, since the density of soap is generally greater than that of water and since the fillings 3m will prevent air from filling the lower grooves, it will be well to provide in the lower surface of the soap a recess forming an air chamber 8 (Figure 23) which may be replaced by small recesses 8 (Figure 26) the latter having the advantage of not excessively affecting the solidity of the soap; in fact this was also suggested in respect to Figure. 7.

The widened sheath as appearing in Figures 20 and 22, unless very tight on the soap and in view of the same difficulty of applying and of being readily damaged, further is open to an objection which did not obtain in the case of the old sheath under Figure 19.

In view of the fact that 3c no longer tightly hangs to the soap, Figure 21 shows that only part AB of sheath 3 acts to hold and keep both part AB and bead 3c from slipping towards the rubbing surface; experience proves that this is insufficient, especially at the start when only a small portion of the sheath is turned back.

Figures 24, 25 and 26 show how to remedy this condition.

Figure 24 shows sheath 3 narrowed at AB, before its mouth is widened.

In Figure 25 the sheath has a rib 3r between parts A and B, which may be added to the narrowing just mentioned.

It will be understood also that without narrowing or ribbing, a similar effect may be attained by rendering the texture of the soft substance tighter at this point.

Naturally the narrowing or ribbing between parts A and B shown in Figures 21 and 25, as well as the contractibility therebetween, increase the pressure of the part of the sheath 3 turned back when same is placed on the soap 2 as shown in Figure. 26.

On Figures 25 and 26 the rib 3r, is supplemented by an inwardly directed flange 3p which may be very useful when travelling for instance to cover as much as possible the rubbing surface as shown in dotted lines on Figure 26; thus the soap may be put in a suit case without requiring the use of a soap box which always collects dirt, is not very practical and takes up too much space.

Figure 27 shows a sheath 3 without the soap, to which sheath fixing ring 3a is attached by means of a rubber band 3q to avoid the loss of same when the sheath is not being used on a piece of soap. The rubber band 3q may be attached to the sheath, as shown in dotted lines, either at the bottom or at a point opposite rib 3m, or at the bead 3c or at any other point of the sheath.

It is particularly advantageous to attach the rubber band at the height of rib 3r, because this is a point which will always be nearest the fixing ring 3a and further this point is not in contact with the soap. This makes it possible to perforate sheath 3 and avoids the useless adjunct of a glued reinforcement for attaching the rubber band. It is preferable to reinforce the openings to avoid tearing sheath 3.

Further it may be advantageous to use a rubber band 3q to pass into the fixing ring 3a and through the openings in sheath 3 and eventually, as is the case in Figure 27, in the flange 3p if such is provided; thus whilst the fixing ring 3a applied on sheath 3 rolls into each successive groove, the rubber band 3q will be drawn in a certain direction like a rope on its pulley and the effect of this will be counter-balanced by the slipping of the rubber band at the point of attachment to rib 3r for instance. This is a great advantage because if the rolling is not compensated, a bulge is formed around the fixing ring 32 on one hand, which hinders the tightening all round and in the neighborhood of the bulge, and the rubber band 3q would stretch too much and become liable to break; to avoid this would necessitate a long rubber band which would be awkward to use at the start.

Figure 28 shows a swelling 2a and a guide 2b of the soap 2, as well as a rib 3s of the sheath 3 of which several may be provided encircling the sheath, or also substituted by an external wide flange either peripheral or not. These have the object of preventing the sheath 3 from engaging the part against which the palm of the hand rests, by forming a cavity where the reversed portion of the sheath may normally accumulate with the least chance of slipping such as appears for example in Figure 18.

However, the foregoing necessitates a material thickness between the last groove and the bottom of the soap; further it is very desirable that this last piece of soap be as thick as possible, as it is difficult to hold a small piece of soap in the hand; obviously, the thicker this piece is, the more soap there will be to be used without its sheath. The soap can be made by providing the block for instance with a very deep recess or by a plurality of recesses 8 (see Figures 23 to 26 and Figure 28); on the other hand if the block is recessed too much, this lessens its solidity.

As shown in Figures 29 and 30 this is the reason for producing a covered soap provided with a core 15 made of wood, or any plastic material or of light rubber (which is more pleasing to the touch) or even of another soap preferably harder than that being used; this core may obviously be reusable for other soaps. It is the covering of the soap and causing absolute water-tightness between soap and core which permits this combination.

In the example of Figure 29 the core 15 has its sides embedded in the soap, whilst in Figure 30 it is more like a bit 15, the part entering the soap being very small; but in the latter case the functioning of the unit is above all achieved by the fact of the presence of the sheath which covers both soap and bit.

Naturally the core and bit 15 may be joined, or not, either to the soap 2 or to the sheath 3.

The addition of the core or bit 15 further offers other advantages, chief of which are the following:

The core or bit may be made of a substance lighter than water, thus improving the floatability of the unit.

In view of the increased floatability, such property may also be preserved by adding the ballast 12 shown in Figure 30, already described under Figure 7, so that the floating unit may be stabilized in a convenient position by letting the non-protected part emerge from the liquid entirely or partially.

Finally, it may be useful to arrange a supplementary space 16 between the soap 2 and the core or bit 15, serving to lodge little bits of non-utilizable soap which will have all the time with the help of the pressure of the hand to stick to the block of soap 2, to be consumed instead of being wasted or used in cases (like laundry aids) where soap is not required. In order to make this soap stick easier in place, it would be useful to provide irregularity 17 in the surface which may be grooves or inscriptions, preferably out or in relief.

Naturally, as far as the bit in Figure 30, is concerned it would be advisable to shape same as in Figure 28, and it may also be advantageous to make grooves in order to receive a rib $3m'$ of sheath 3, which obviously will not hinder the provision of a rib $3m$ filling the last groove of the soap, in order to improve considerably the solidity of the unit. Bit 15 may further be provided with a groove 18 to receive fixing ring $3a$ after the soap is used and pending the insertion of another piece of soap.

Naturally the embodiments of the invention which are described and presented above are only examples and, both jointly and separately, they may vary to a great extent, or be adapted to other tablet or block even if the latter are not slippery or do not have to float, without departing from the invention hereinafter claimed.

I claim:

1. The combination, with a soap tablet having an end wearing surface, and having its lateral faces formed with a series of flutings substantially parallel to said wearing surface and extending peripherally around the tablet, and a pliable waterproof protective sheath mounted on said tablet and extending over said lateral faces, an elastic fixing ring pressing the portion of the wall of said sheath adjacent the fluting nearest said wearing surface, within said fluting, the portion of said sheath beyond said ring being reversely folded over the same and having its outer edge free from said fixing ring, said free edge serving as a means for advancing the ring and sheath from one fluting to the adjacent fluting.

2. The combination, with a soap tablet having an end wearing surface, and having its lateral faces formed with a series of flutings substantially parallel to said wearing surface and extending peripherally around the tablet, and a pliable waterproof protective sheath mounted on said tablet and extending over said lateral faces, an elastic fixing ring pressing the portion of the wall of said sheath adjacent the fluting nearest said wearing surface, against the edges of said fluting, the portion of said sheath beyond said ring being reversely folded over the same and having its outer edge free from said fixing ring, said free edge serving as a means for advancing the ring and sheath from one fluting to the adjacent fluting.

3. The combination recited in claim 1 and further having a hollow ring interposed between the body of said sheath and said reversely folded portion, contributing to the buoyancy of the combination.

4. The combination recited in claim 1, and further having the edge of said sheath being formed with a bead having a relatively low specific gravity so as to contribute to the buoyancy of the combination.

5. The combination recited in claim 1 and further having said ring fixed to said sheath near the mouth so that the size of the portion of said sheath beyond said ring remains the same all the time of the use of said tablet.

6. The combination recited in claim 1, and further having said sheath widened toward its opening to facilitate the operation of pulling down the portion of sheath beyond said ring.

7. The combination recited in claim 1 and further having said sheath provided with fillings adapted to engage said flutings and prevent said sheath from slipping from the cake when pulling down the portion of sheath beyond the ring.

8. The combination recited in claim 1 and further having said sheath provided with fillings adapted to engage said flutings and prevent said sheath from slipping from the cake when pulling down the portion of sheath beyond the ring, said fillings being themselves provided with a groove to receive the fixing ring.

9. The combination recited in claim 1, and further having said sheath at a point spaced from its mouth formed with an inwardly flared portion which will maintain more tightly the beyond ring portion of the sheath over the same.

CLAUDE MEYER.